US012738016B2

(12) United States Patent
Lin et al.

(10) Patent No.: US 12,738,016 B2
(45) Date of Patent: Sep. 15, 2026

(54) IMAGE ANALYZATION METHOD WITH UNRECOGNIZED OBJECT MEMORY MECHANISM

(71) Applicant: FENG CHIA UNIVERSITY, Taichung City (TW)

(72) Inventors: Wei-Lun Lin, Taichung City (TW); Shao-Mao Wang, Taichung City (TW)

(73) Assignee: FENG CHIA UNIVERSITY, Taichung City (TW)

( * ) Notice: Subject to any disclaimer, the term of this patent is extended or adjusted under 35 U.S.C. 154(b) by 277 days.

(21) Appl. No.: 18/581,941

(22) Filed: Feb. 20, 2024

(65) Prior Publication Data

US 2025/0265807 A1 Aug. 21, 2025

(51) Int. Cl.

*G06V 10/44* (2022.01)
*G06T 7/12* (2017.01)
*G06V 10/764* (2022.01)
*G06V 20/70* (2022.01)

(52) U.S. Cl.

CPC ................ *G06V 10/44* (2022.01); *G06T 7/12* (2017.01); *G06V 10/764* (2022.01); *G06V 20/70* (2022.01); *G06T 2207/20084* (2013.01); *G06V 2201/07* (2022.01)

(58) Field of Classification Search

CPC ...... G06V 10/44; G06V 20/70; G06V 10/764; G06T 7/12

See application file for complete search history.

(56) References Cited

U.S. PATENT DOCUMENTS 11,580,622 B2 * 2/2023 Fu ............................ G06T 7/12
11,625,513 B2 * 4/2023 Bagschik ................ G06F 30/15 703/8
11,734,473 B2 * 8/2023 Modalavalasa ...... G05D 1/0088 703/8
11,987,264 B2 * 5/2024 Thakur .................. G06N 3/045
(Continued)

FOREIGN PATENT DOCUMENTS

CN 114333011 A 4/2022
CN 117392638 A 1/2024
TW 201923707 A 6/2019

*Primary Examiner* — Mohammed H Zuberi

(74) *Attorney, Agent, or Firm* — Birch, Stewart, Kolasch & Birch, LLP

(57) ABSTRACT

An image analyzation method with an unrecognized object memory mechanism are provided. Initially, whether a target object belongs to a known category using an object recognition model is determined; if not, then the object memory mechanism is executed. The mechanism first obtains image feature information through a feature extraction algorithm, and generates an attention representative value by a feature classifier. The target objects are grouped according to the numerical range it belongs to and stored in corresponding specified directories. When the number of target images in a directory reaches a quantity threshold, a new category label is assigned to the target images and used as retraining data for the object recognition model. The image analyzation method classifies unrecognized objects and enables the object recognition model to recognize unrecognized objects through learning, without the need for manual labeling of unrecognized objects, thereby saving resources and cost.

7 Claims, 3 Drawing Sheets

(56) References Cited

U.S. PATENT DOCUMENTS

| | | | | |
|---|---|---|---|---|
| 2015/0170002 | A1* | 6/2015 | Szegedy | G06V 30/194 382/156 |
| 2020/0026287 | A1* | 1/2020 | Jiang | G06N 3/09 |
| 2020/0175344 | A1* | 6/2020 | Li | G06N 20/20 |
| 2021/0110439 | A1* | 4/2021 | Jayne | G06V 10/82 |
| 2021/0365719 | A1* | 11/2021 | Kalyuzhner | G06V 10/758 |
| 2022/0058809 | A1* | 2/2022 | Fuchs | G06V 10/751 |
| 2022/0108546 | A1 | 4/2022 | Xu et al. | |
| 2022/0222484 | A1* | 7/2022 | Esteva | G06N 3/0464 |
| 2023/0081909 | A1* | 3/2023 | Wu | G06V 40/172 382/100 |
| 2023/0326041 | A1* | 10/2023 | Babazaki | G06N 3/0464 382/103 |
| 2024/0265551 | A1* | 8/2024 | Ray | G06V 10/764 |
| 2024/0265715 | A1* | 8/2024 | Ho | G06V 20/56 |

* cited by examiner

IMAGE ANALYZATION METHOD WITH UNRECOGNIZED OBJECT MEMORY MECHANISM

BACKGROUND OF THE INVENTION

1. Field of the Invention

The present invention relates to an image analyzation method, and more particularly to an image analyzation method with an unrecognized object memory mechanism.

2. Description of the Related Art

The conventional image object detection technologies can generally be divided into two application directions. The first direction is to identify the categories of objects in an image; the other direction is to label or separate the areas belonging to the same object in the image.

In the applications of identifying object category in images, for instance, identification is performed by using a trained large-scale object recognition model to determine if there are known objects in the image, and marking the detected objects with detection boxes as the identification result. The generation of the large-scale object recognition model requires training the machine learning model with a large amount of labeled training image data, so that it can recognize objects in new images that match the labeled categories.

In the applications of labeling or separating objects in images, for example, labeling or separating is performed by using semantic segmentation algorithms to mark the pixel blocks of the same object in the image. Semantic segmentation usually differentiates pixel blocks from the background based on image properties such as texture, size, color, shape, etc. However, semantic segmentation algorithm cannot identify the category of objects, meaning it cannot determine the similarity of objects in multiple images or create associations among objects in different images.

In some combined applications, detection boxes from large-scale object recognition model and object masks from semantic segmentation algorithms are generated based on the same image. Furthermore, the Intersection Over Union (IOU) between the detection boxes and object masks is calculated to determine the accuracy of the object recognition by the large-scale object recognition model.

However, when an image to be processed contains any object that does not belong to any of the known categories of the trained large-scale object recognition model, the model cannot identify such objects. Training a large-scale object detection system to recognize unrecognized objects requires a large amount of labeled training data, and providing a large amount and high-quality training data is quite costly in terms of both expenses and workload. On the other hand, semantic segmentation algorithms can only separate objects from the background without identifying their categories. The aforementioned combined applications can only judge the accuracy of the large-scale object recognition model, and when the large-scale object recognition model fails to effectively identify objects, it still cannot further determine the category of object in the image.

In conclusion, conventional image analyzation technologies for object detection must be further improved in the aspect of recognizing unrecognized objects.

SUMMARY OF THE INVENTION

Given the challenge that existing image object detection technologies face in effectively recognizing the categories of new, untrained objects in input images, and the high cost of training models to recognize unrecognized objects, an objective of the present invention is to provide an image analyzation method with an unrecognized object memory mechanism. To achieve the foregoing objective, the image analyzation method includes:

reading a target image, wherein the target image includes a target object;

determining whether the target object is a known category object through an object recognition model;

if the target object does not belong to a known category, executing an object memory mechanism, comprising:

generating an image feature information of the target object through a feature extraction algorithm;

performing a feature classification process on the image feature information to produce an attention representative value, and determining a numerical range to which the target object belongs;

storing the target image in a specified directory corresponding to the numerical range in an image database;

determining whether a number of at least one stored image in the specified directory exceeds a quantity threshold;

if the number of the at least one stored image exceeds the quantity threshold, assigning a new category label to the at least one stored image, and inputting the at least one stored image after labeling, as training data into the object recognition model in a retraining process; wherein the object recognition model recognizes the target object after the retraining process.

The image analyzation method with an unrecognized object memory mechanism of the invention generates the attention representative value by extracting and classifying features of the target object in the target image, and stores the target image in different specified directories based on the numerical range of the attention representative value, thus performing the clustering based on similar features of the target object. When the number of stored images in a specified directory reaches a quantity threshold, a new category label is assigned to the stored images with similar features, which are then used as training data for retraining the object recognition model. Through such process, the object recognition model can recognize objects in new input images having features similar to the target object. This method provides an object recognition model, which originally could not recognize a new type of object, with a mechanism similar to human memory and learning. After training, the object recognition model is able to recognize new types of objects based on their image features, without the need for manual labeling, thus saving manpower and cost.

Other objectives, advantages and novel features of the invention will become more apparent from the following detailed description when taken in conjunction with the accompanying drawings.

DETAILED DESCRIPTION OF THE INVENTION

Figure 1A:
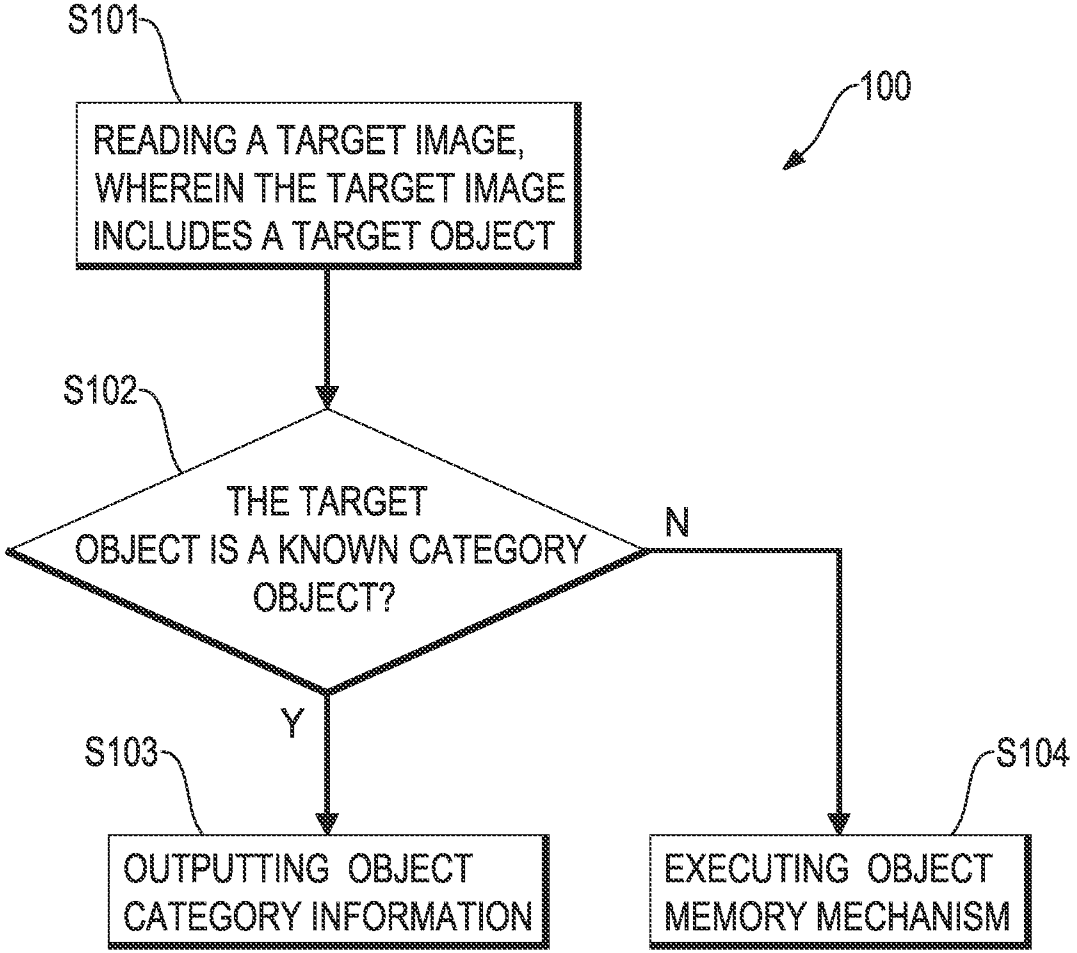
FIGS. 1A to 1B are flowcharts of the image analyzation method with an unrecognized object memory mechanism according to the invention.
Figure 1B:
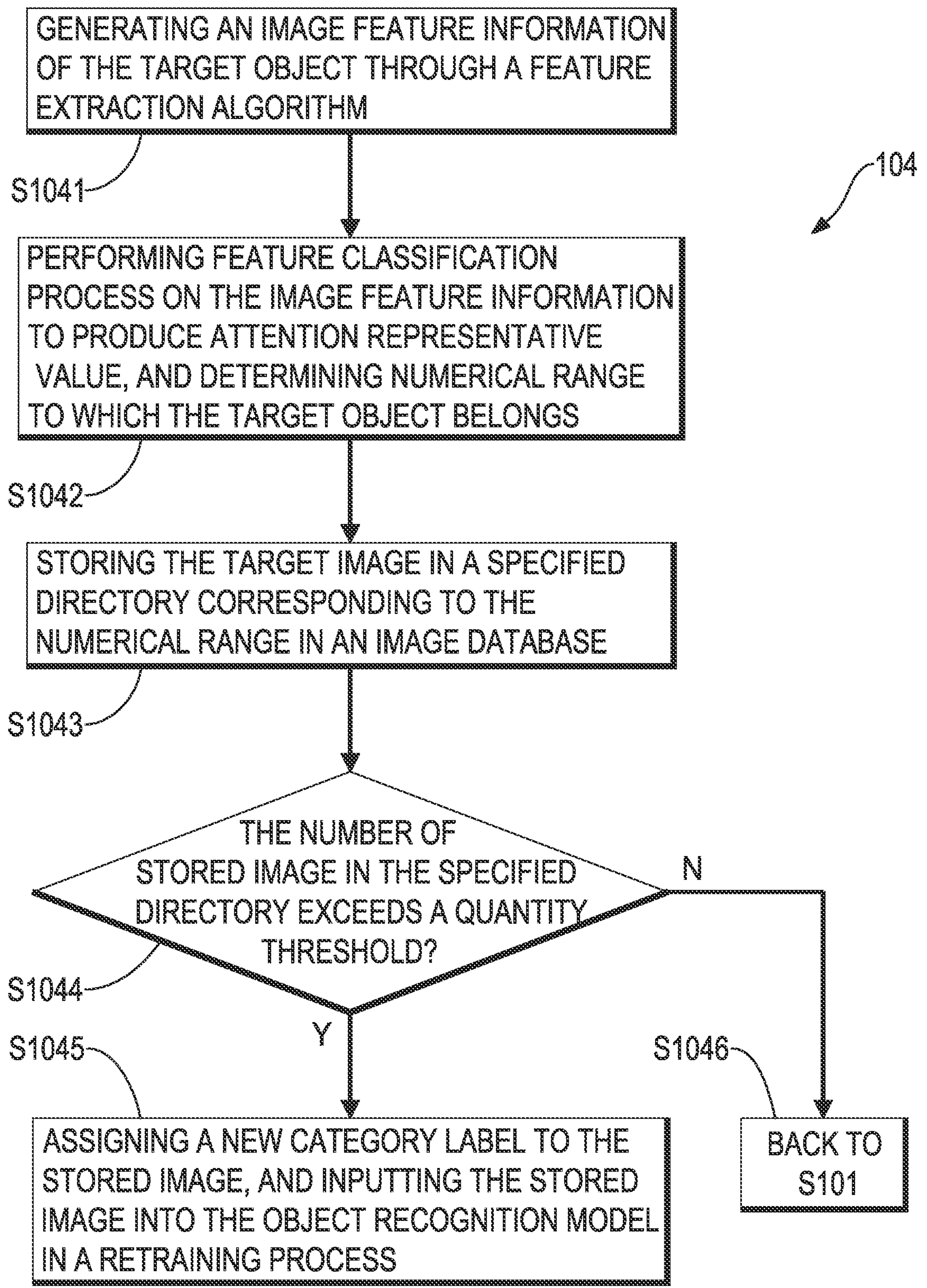
Figure 2:
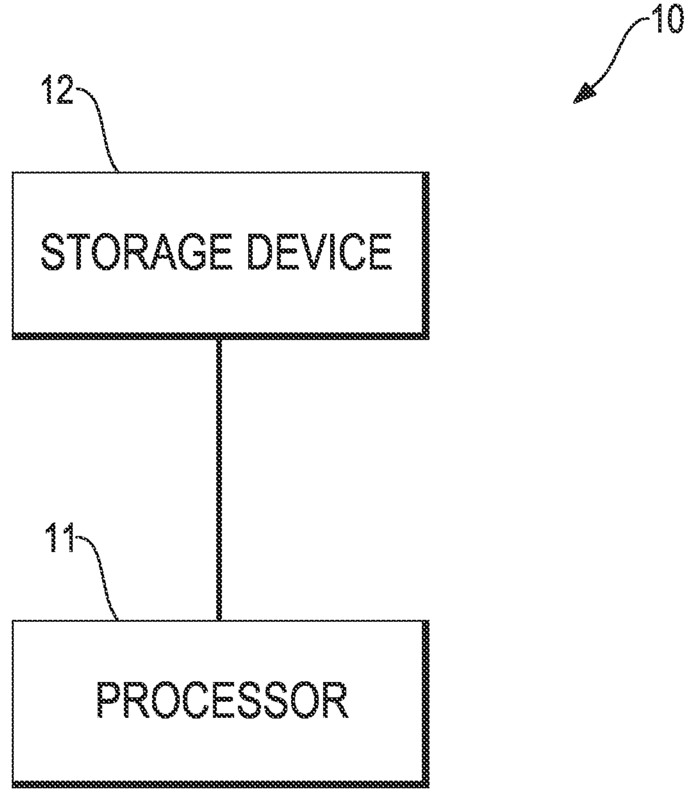
FIG. 2 is a block diagram of the image analyzation device with an unrecognized object memory mechanism.

With reference to FIGS. 1A, 1B and FIG. 2, the image analyzation method with an unrecognized object memory mechanism 100 of the present invention is executed by an image analyzation device 10 with an unrecognized object memory mechanism. The image analyzation method 100 includes steps S101 to S105. The image analyzation device 10 includes a processor 11 and a storage device 12, where the storage device 12 is used to store at least one stored image, with each stored image under a specified directory corresponding to different numerical ranges.

The processor 11, for example, is a central processing unit (CPU), an image processing unit (GPU), a digital signal processor (DSP), etc.; the storage device 12, for example, is read-only memory (ROM), random-access memory (RAM), a solid-state drive (SSD), flash memory, etc. However, the invention is not limited to these.

With reference to FIG. 1A, the steps S101 to S104 of the image analyzation method with an unrecognized object memory mechanism are further explained below.

In step S101, the processor 11 receives a target image that contains a target object.

More specifically, the processor 11 has an input/output interface for receiving information and outputting computational results. The target object, for example, is identified by the processor performing a semantic segmentation process on the received target image, classifying multiple pixels within the target image, producing at least one object mask, and defining the pixels within the range of the object mask as the target object. Preferably, the object mask generated by the semantic segmentation process is an irregular mask.

The semantic segmentation process produces object masks based on features such as texture, color, edges, shape, and size in the target image. Preferably, the semantic segmentation model is any one of the following: a Segment Anything Model (SAM), a Hybrid Gene Algorithm (HGA) model, and a Mask Region-Based Convolutional Neural Networks (R-CNN) model, but the invention is not limited to these.

In step S102, the processor 11 inputs the target object into an object recognition model to determine whether the target object is a known category object. The object recognition model is a model pre-trained with multiple labeled data and capable of recognizing at least one category of object based on features such as texture, color, edges, shape, and size in images. When the input target object belongs to one of the object categories recognizable by the object recognition model, the object recognition model outputs corresponding object category information, as in step S103. If the input target object does not belong to any of the recognizable categories by the object recognition model, the object recognition model outputs a recognition failure information. Hence, the processor determines that the target object does not belong to any known category, and thus executes the object memory mechanism, as in step S104. The purpose of the object memory mechanism is to enable the object recognition model to understand, learn, or remember the features of the target object or similar objects, so that the object memory mechanism is able to recognize similar objects upon input of new target images and determine the new target images to be of the same category as the target object.

With reference to FIG. 1B, the object memory mechanism includes steps S1041 to S1046, which will be further explained in detail below.

In step S1041, the processor 11 inputs the target object from the target image into a feature extraction algorithm to generate image feature information. The feature extraction algorithm may include at least one of a Principal Components Analysis (PCA), deep learning neural network autoencoders, Scale-Invariant Feature Transform (SIFT), etc., but the invention is not limited to these.

In step S1042, the processor 11 generates an attention representative value through a feature classification process on the image feature information and determines the numerical range of the attention representative value. More specifically, this step first generates an attention value through a feature classifier, and then converts the attention value into an attention representative value through a normalization function. For example, the normalization function could be a SoftMax function, with its domain ranging from 0 to 1. Hence, the attention representative value is a real number between to 1, represented as a percentage of the attention representative value. The feature classifier, for instance, could be any one of a Convolutional Neural Network (CNN) model, a Long-Short Term Memory Neural Network (LSTM) model, or an attention mechanism of a Transformer model. Preferably, the feature classifier is a self-attention mechanism of a Transformer model.

Before determining the numerical range of the attention representative value, the domain of the normalization function is divided into multiple numerical ranges based on a preset number of intervals, which can be determined based on system design, preset image types, or similarity requirements. For example, if the preset number of intervals is 10, then the domain 0% to 100% (0 to 1) is divided into intervals of 10% each, with each numerical range having an upper limit and a lower limit, e.g., 0% to 9.999% (first interval), 10% to 19.999% (second interval), . . . 90% to 99.999% (tenth interval). When the attention representative value is between an upper limit and a lower limit of one of these intervals, it is determined to belong to that numerical range. For instance, if the attention representative value is 56%, it belongs to the 50% to 59.999% (sixth interval).

In step S1043, the processor 11 stores the target image in the specified directory corresponding to the determined numerical range in the storage device 12 as a stored image. In the aforementioned example, where the preset number of intervals is 10, there are ten directories corresponding to the first to the tenth intervals, and the target image with an attention representative value of 56% stored in the sixth directory. This step stores target images with attention representative values of the same numerical range in the same specified directory. Target objects in the stored images within the same specified directory, having attention representative values in the same numerical range, are defined as belonging to the same category of objects.

In step S1044, the processor 11 determines whether the number of at least one stored image in the specified directory exceeds a quantity threshold. In step S1045, when the number of stored images in the specified directory exceeds the quantity threshold, a new category label is assigned to the at least one stored image containing the target image, and the labeled stored images are inputted to the object recognition mode as training data in a retrain process of the object recognition model. The retraining process enables the object recognition model to recognize the target object and similar object image after the retraining. Conversely, in step S1046, when the number of stored images in the specified directory does not exceed the quantity threshold, the process for this target image is concluded. When a new target image is received, steps S101 to S104 are executed again.

In step S1044, when the number of stored images in the specified directory accumulates to a sufficient amount to serve as training data for the object recognition model's quantity threshold, the processor 11 assigns a new category label to these stored images. In step S1045, the stored images are used as training data in the retraining process of the object recognition model. If the number of target images in the specified directory has not yet exceeded the quantity threshold, the storage device 12 continues to accumulate stored images that have been clustered in each specified directory.

In summary, the image analyzation method with an unrecognized object memory mechanism according to the present invention provide a learning and memory mechanism for unrecognized objects that are originally unrecognizable by the object recognition model. Target images are grouped based on the numerical range of the attention value generated by the feature classifier. Grouped stored images that are accumulated by a certain amount are labeled and utilized as training data to enable the object recognition model to "learn and remember" the image features of such new category objects. Consequently, the model becomes capable of recognizing similar target objects in the future, achieving a computer-automated learning and memory mechanism similar to how humans learn and remember unrecognized objects in images.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An image analyzation method with an unrecognized object memory mechanism, the method comprising:

reading a target image, wherein the target image includes a target object;

determining whether the target object is a known category object through an object recognition model;

if the target object does not belong to a known category, executing an object memory mechanism, comprising:

generating an image feature information of the target object through a feature extraction algorithm;

performing a feature classification process on the image feature information to produce an attention representative value, and determining a numerical range to which the target object belongs, wherein the feature classification process comprises:

generating an attention value through a feature classifier; and converting the attention value into the attention representative value through a normalization function;

storing the target image in a specified directory corresponding to the numerical range in an image database;

determining whether a number of at least one stored image in the specified directory exceeds a quantity threshold; and if the number of the at least one stored image exceeds the quantity threshold, assigning a new category label to the at least one stored image, and inputting the at least one stored image after labeling, as training data into the object recognition model in a retraining process; wherein the object recognition model recognizes the target object after the retraining process.

2. The image analyzation method with the unrecognized object memory mechanism as claimed in claim 1, further comprising:

performing a semantic segmentation process on the target image to classify multiple pixels therein, producing at least one object mask; and defining a pixel collection within a range of the object mask in the target image as the target object.

3. The image analyzation method with the unrecognized object memory mechanism as claimed in claim 2, wherein the semantic segmentation process is performed by any one of the following:

a segment anything model (SAM), a hybrid gene algorithm (HGA) model, and a mask region-based convolutional neural network (R-CNN) model.

4. The image analyzation method with the unrecognized object memory mechanism as claimed in claim 2, wherein:

the object mask is an irregular mask.

5. The image analyzation method with the unrecognized object memory mechanism as claimed in claim 1, further comprising:

dividing the domain of the normalization function into a preset number of numerical ranges based on a preset number of intervals, each numerical range having an upper limit and a lower limit, and the numerical ranges being non-overlapping; wherein, when the attention representative value is between the upper and lower limits of one of the numerical ranges, determining that the attention representative value belongs to the one of the numerical ranges.

6. The image analyzation method with the unrecognized object memory mechanism as claimed in claim 1, wherein:

when the object recognition model outputs an object category information as a result, the target object is a known category object.

7. The image analyzation method with the unrecognized object memory mechanism as claimed in claim 1, wherein the feature classifier is any one of the following:

a convolutional neural network model, a long short-term memory neural network model, and an attention mechanism of a transformer model; and the normalization function is a Softmax function.

* * * * *